(12) United States Patent
Heggen

(10) Patent No.: US 12,428,174 B2
(45) Date of Patent: Sep. 30, 2025

(54) HYBRID SYSTEMS FOR DRONES AND OTHER MODES OF TRANSPORT

(71) Applicant: Lars Harald Heggen, Drammen (NO)

(72) Inventor: Lars Harald Heggen, Drammen (NO)

(*) Notice: Subject to any disclaimer, the term of this patent is extended or adjusted under 35 U.S.C. 154(b) by 76 days.

(21) Appl. No.: 17/785,857

(22) PCT Filed: Dec. 14, 2020

(86) PCT No.: PCT/NO2020/050312
§ 371 (c)(1),
(2) Date: Jun. 15, 2022

(87) PCT Pub. No.: WO2021/125968
PCT Pub. Date: Jun. 24, 2021

(65) Prior Publication Data
US 2023/0010644 A1 Jan. 12, 2023

(30) Foreign Application Priority Data
Dec. 16, 2019 (NO) .................................. 20191482

(51) Int. Cl.
*B64U 50/27* (2023.01)
*B64D 35/025* (2025.01)
(Continued)

(52) U.S. Cl.
CPC ........... *B64U 50/27* (2023.01); *B64D 35/025* (2024.01); *B64U 10/16* (2023.01); *B64U 50/19* (2023.01); *B64U 50/11* (2023.01)

(58) Field of Classification Search
CPC ....... B64U 50/20; B64U 50/27; B64D 35/025
See application file for complete search history.

(56) References Cited

U.S. PATENT DOCUMENTS

| 3,566,717 A | 3/1971 | Berman |
| 9,751,625 B2 | 9/2017 | Phan et al. |

(Continued)

FOREIGN PATENT DOCUMENTS

| CN | 108082499 A | 5/2018 | |
| CN | 108082500 A * | 5/2018 | ............. B64D 27/02 |

(Continued)

OTHER PUBLICATIONS

PCT/NO2020/050312. International Search Report (Mar. 11, 2021).
Corresponding European Application No. EP20901367. Supplementary Search Report (Nov. 16, 2023).

*Primary Examiner* — Joseph W Sanderson
(74) *Attorney, Agent, or Firm* — Peter Zura; LOZA & LOZA, LLP

(57) ABSTRACT

A hybrid system for drones and other modes of transport. A combustion engine provides range and/or lifting capacity for drones while electric motors/generators provide both control and maneuverability. One or more combustion engines, in conjunction with one or more electric motors/generators form a propulsion system whereby each is connected to and drives its own driving pinion in one or more planetary gear sets, and provide continuously variable transmission for driving propellers or driveshafts. The combustion engine may be connected directly to one of the planetary gear's driving pinions, or can drive one of the planetary gear's driving pinions. If the propellers are only driven by either a combustion engine, or an electric motor/generator, the other engine/motor will be kept at rest by a braking device for a combustion engine or a braking device for an electric motor/generator.

20 Claims, 6 Drawing Sheets

(51) Int. Cl.
 *B64U 10/16* (2023.01)
 *B64U 50/11* (2023.01)
 *B64U 50/19* (2023.01)

(56) References Cited

U.S. PATENT DOCUMENTS

| | | | |
|---|---|---|---|
| 10,899,461 B2* | 1/2021 | Livieratos | F02D 13/0269 |
| 11,149,662 B2* | 10/2021 | Heggen | F02D 19/0671 |
| 11,401,042 B2* | 8/2022 | Peleg | B60L 50/60 |
| 11,542,878 B2* | 1/2023 | Heggen | F02D 19/0671 |
| 11,745,888 B2* | 9/2023 | Harvey | B64D 35/08 |
| | | | 244/53 R |
| 2011/0281679 A1* | 11/2011 | Larrabee | B64D 27/04 |
| | | | 903/910 |
| 2012/0149516 A1 | 6/2012 | Larrabee et al. | |
| 2012/0329593 A1* | 12/2012 | Larrabee | B64C 39/024 |
| | | | 903/910 |
| 2017/0217586 A1 | 8/2017 | Goelet | |
| 2017/0253331 A1 | 9/2017 | Nakashima | |
| 2018/0030887 A1* | 2/2018 | Zhao | F02B 75/16 |
| 2018/0194484 A1* | 7/2018 | Livieratos | F02D 13/0269 |
| 2019/0061924 A1 | 2/2019 | Kita | |
| 2020/0262574 A1* | 8/2020 | Peleg | B64C 39/024 |
| 2021/0164407 A1* | 6/2021 | Heggen | F02M 25/12 |
| 2021/0179286 A1* | 6/2021 | Harvey | F01D 15/10 |
| 2022/0033097 A1* | 2/2022 | Botti | B64D 27/10 |
| 2022/0056856 A1* | 2/2022 | Heggen | F02B 19/1028 |

FOREIGN PATENT DOCUMENTS

| | | |
|---|---|---|
| CN | 207889994 U | 9/2018 |
| DE | 102014224637 A1 | 6/2016 |
| NO | 20171354 A1 | 2/2019 |
| WO | 2015073084 A | 5/2015 |
| WO | 2018132406 A1 | 7/2018 |
| WO | 2019082043 A2 | 5/2019 |

\* cited by examiner

HYBRID SYSTEMS FOR DRONES AND OTHER MODES OF TRANSPORT

RELATED APPLICATIONS

The present application claims priority to International Patent App. No. PCT/NO2020/050312, to Lars Harald Heggen, filed on Dec. 14, 2020, which claims priority to Norwegian Patent App. No. 20191482, filed Dec. 16, 2019, the contents of each being incorporated by reference in their entirety herein.

TECHNICAL FIELD

The present disclosure relates to hybrid systems for drones and other modes of transport.

BACKGROUND

Drones, in particular, have used purely electrical propulsion systems up to now. This limits their range because the energy supply must be based on batteries, except where the drone is intended for stationary hovering at a specific position. In this case electric current can be supplied via a cable, which may also function as part of a guying or anchoring system.

The advantage of electrical operation is that the efficiency of an electrical propulsion system is high and there is good utilization of the energy stored in the battery. The disadvantage of batteries is that they have low energy density, compared with traditional fuels used in combustion engines.

Many systems for hybrid operation of drones have been proposed, but the common factor is that they are based on using separate systems for propulsion and electric current generation. Up to now, traditional electrical propulsion systems have been used for drones, with a separate generator set for electric current production. Such systems are very similar to what are described as "range extenders" in electric cars.

U.S. Pat. No. 3,566,717 "Power Train Using Multiple Power Sources" discloses a hybrid systems for vehicles. Norwegian Patent 343554, discloses a zero-emissions propulsion systems and generator sets using ammonia as fuel.

SUMMARY

The present disclosure solves aspects of this problem by using a propulsion system where one or more combustion engines can be used in conjunction with one or more electric motors/generators for propulsion, or where one or more combustion engines can be used in conjunction with one or more electric motors/generators for both propulsion and charging a battery/batteries and any capacitor(s). One or more combustion engines, in conjunction with one or more electric motors/generators, will be an integral part of a propulsion system whereby each is connected to and drives its own driving pinion in one or more planetary gears. This will also provide continuously variable transmission for driving propellers or driveshafts on drones or other modes of transport.

The advantage of this type of hybrid system is that a combustion engine provides range and/or lifting capacity for drones and other modes of transport, while the electric motors will provide both control and maneuverability, because electric motors can give more precise control and speed regulation.

For drones, this will normally mean that a combustion engine will have enough power to keep the drone in the air and give it forward thrust, as well as charging of its batteries and capacitators. In addition, the drone will have electric motors/generators with either the same or double the power output of the combustion engine, in order to provide the drone with back-up lifting capacity (redundancy). Other power output relationships are also possible, depending on the redundancy requirement.

The size of the fuel tank will depend on the quantity or weight of fuel needed by the drone to sustain its required flying time. The battery capacity will normally be dimensioned according to the flying time specified for the drone if the combustion engine fails. If the drone does not require redundancy in its propulsion system the quantity of fuel and battery capacity can be adjusted to provide sufficient flying time.

As an extra energy system, one or more capacitators may also be used to deliver supplementary high power to electric motors. This may be useful for take-off with a heavy load, or to give the drone additional maneuvering capability. The same type of design can be used for other modes of transport.

In a helicopter the combustion engine (normally a gas turbine) may either be connected directly to an electric motor/generator and main rotor, or the combustion engine may be connected to an electric motor/generator and main rotor, each via its own driving pinion in a planetary gearset. The latter configuration will normally be adopted if the tail rotor is to be driven electrically. It can also be used to provide redundancy in the helicopter's propulsion system, if a large enough battery pack is provided to give the helicopter sufficient duration to land at a suitable landing site.

In a ship a combustion engine may for example either be connected to an electric motor/generator and main propeller directly, or the combustion engine may be connected to an electric motor/generator and main propeller, each via its own driving pinion in a planetary gearset. The latter configuration offers partial zero-emissions operation in (for example) ports, or sea areas that are ecologically vulnerable or subject to special emissions regulations. It also provides for electrical operation of other propellers such as one or more azimuth thrusters/pods, bow thrusters etc. This arrangement makes it easy to use the electric motors to control the speed of the propellers, so a system of this kind can also be used for maneuvering drones, ships and other modes of transport.

The combustion engine will have a separate tank for lubricating oil and some or all of its fuel tank(s) may be pressurized, so that oil and fuel can always be pressure-fed to the lubrication and fuel systems. For example, cooled exhaust gases may be used to fill a bag inside an oil or fuel tank, so that the oil or fuel in the oil or fuel system is always under pressure. Combustion engines, electric motors/generators and propellers/driveshafts will also have speed sensors to enable the hybrid system to be controlled/regulated and they will be fitted with braking/locking devices. These devices will either operate directly, or act on their respective driving pinions in the planetary gearset, so that the planetary gear can function either as a continuously variable transmission or as a traditional gearbox with fixed-axis gears.

BRIEF DESCRIPTION OF THE DRAWINGS

Aspects of the present disclosure will now be explained on the basis of exemplary embodiments with reference to the drawings.

DETAILED DESCRIPTION

Figure 1:
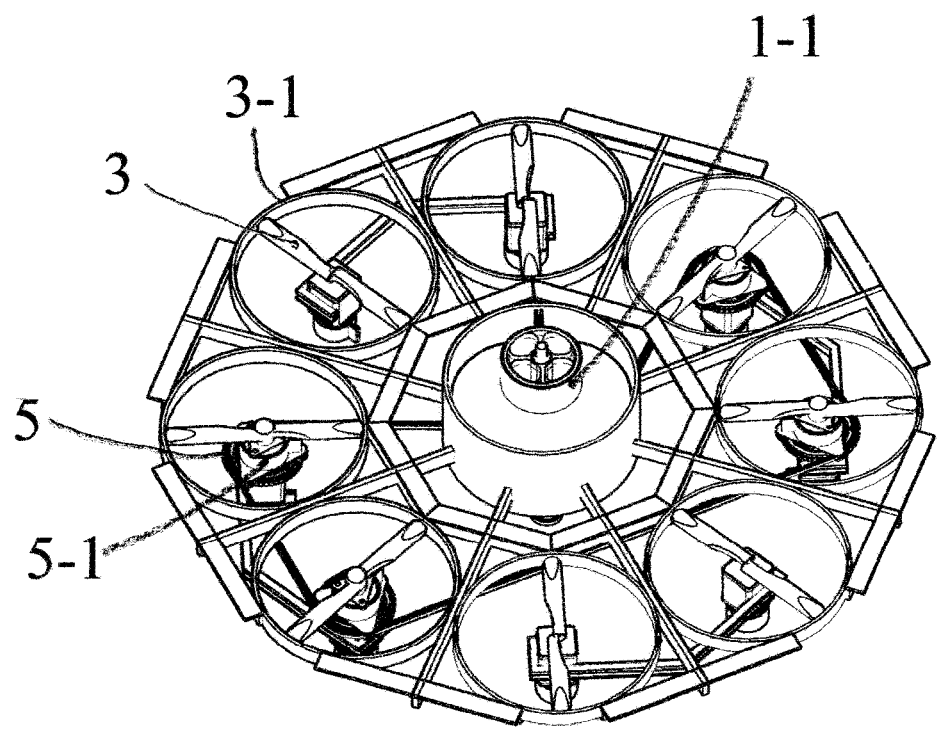
FIG. 1 illustrates a drone device, seen from above, including a plurality of propellers, where some are driven electrically, and others use hybrid systems under some aspects of the present disclosure.
Figure 2:
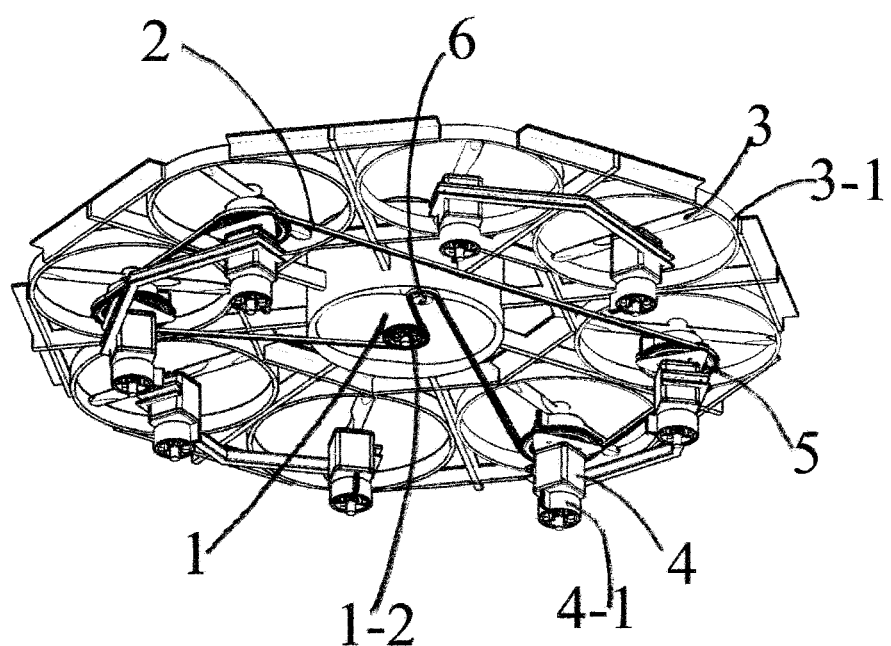
FIG. 2 illustrates the embodiment in FIG. 1, seen from below, where the planetary gears for hybrid operation are belt-driven, under some aspects of the present disclosure.

1) Combustion Engine.

In some examples, there may be one or more combustion engines of varying types/designs. However, for those designs where it is important to minimize weight, a solution using a Wankel engine or other type of rotary engine will normally be suitable.

An alternative is a 2-stroke piston engine. Other types of combustion engine may be chosen where the design is based on different operating criteria. For ships where a zero- or low-emissions solution is required, a "dual-fuel" 4-stroke combustion engine may be utilized, for example with ammonia as the main fuel. For drones and other aircraft many engine components, for example the engine block and possibly the cylinder head for piston engines, may be wholly or partially constructed of lightweight metals such as aluminum or magnesium, in order to save weight. Other components such as fairings and intakes may be made of composite materials.

1-1) Braking Device for Combustion Engine.

The purpose of the device in some examples is to lock the combustion engine (1) and prevent it from rotating, in an operational mode where the propellers (3) are driven purely by electricity. Any form of braking device may be used, but a drum brake design will normally be appropriate. (See also 4-1 and 5-1)

1-2) the Combustion Engine's Drive Pulley for Belt/Chain Operation.

For drones, the combustion engine (1) will normally drive propellers (3) and/or generators (4) via a planetary gear (5) using a belt or chain (2). Cogwheel transmission may also be used and this may also be the case in other propulsion systems, for example a propulsion system for a ship.

2) Drivebelt/Chain (Driveshaft in Trains)

For drones, the combustion engine (1) will normally drive propellers (3) and/or generators (4) via a planetary gear (5) using a belt or chain (1-2). Cogwheel transmission may also be used for other propulsion systems. In propulsion systems for trains etc., belt/chain drives may be replaced by a driveshaft driving a planetary gear directly (5), or transmission may be via one or more fixed-axis gears. Alternatively, the planetary gearset (5) may be fitted directly to the combustion engine (1).

3) Propeller. (with Driveshaft).

In this example, the propeller may be configured for a drone or ship, which the system is designed to drive. Its purpose may be to provide lift and forward thrust for an aircraft, or propulsion for a seagoing vessel. For modes of transport on land such as trains, the propeller will be replaced by a driveshaft or drive wheel. Alternatively, a separate generator, hydraulic pump ("converter") etc., may be driven and used to transfer energy to a propulsion system.

3-1) Propeller Duct/Diffuser

In some examples, the function of the propellor duct/diffuser is to protect the surroundings from a rotating propeller (3), or vice versa, while increasing the propeller's utilization of the power supplied by the combustion engine (1) and/or electric motor/generator (4). This is a typical solution for drones or ships.

4) Electric Motor/Generator

In a hybrid system, the electric motor/generator functions both as a motor and as a generator. It may be configured as a synchronous motor with windings in the rotor that allow the charging rate and the motor's braking torque to be varied, by adjusting the voltage and thus the magnetic field in the rotor.

4-1) Braking Device for an Electric Motor/Generator

In some examples, the purpose of the braking device is to lock an electric motor/generator (4) and prevent it from rotating, in the operating mode where the propellers are driven purely by the combustion engine (1). Any form of braking device may be used, but a drum brake design may be preferred. (See also 1-1 and 5-1)

5) Planetary Gearset.

In some examples, the planetary gearset is configured as the gear unit that distributes power to and from the units in the propulsion system such as a combustion engine (1), propeller (3) and electric motor/generator (4). Traditionally, the principle employed for the gears in a planetary gearset has been to keep one of the driving pinions (5-2-5-5) fixed and thus have fixed-axis gearing between the other two drives. By adjusting the speed on all the driving pinions (5-2-5-5) at the same time, the planetary gearset will function as a continuously variable transmission. Another possibility is for this to be a ravigneaux gear in order to have a transmission that optimizes operating conditions for both a combustion engine (1) and electric motor/generator (4). The planetary gearset can be independent, with drive systems for a combustion engine (1), electric motor/generator (4) and propeller (3). Alternatively, it can be fitted as part of either a combustion engine (1) or electric motor/generator (4) and propeller (3). For drones the normal solution will be that the combustion engine (1) drives several planetary gears (5) that are fitted as part of, or together with an electric motor/generator (4) and propeller (3).

5-1) Braking Device for Planet Carrier.

In some examples, the purpose of this braking device is to lock the planet carrier (5-4) and prevent it from rotating. Normally the propeller (3) will be connected to the planet carrier (5-4) and the braking device will normally be used in cases where personnel are in contact with a vessel or other parts of the propulsion machinery, as well as in cases where the electric motor(s)/generator(s) (4) are used to start up the combustion engine(s) (1). Or if the combustion engine(s) (1) are used to drive electric motor(s)/generator(s) (4) to charge the batteries (7) and/or capacitors (8). Any form of braking device may be used, but a drum brake design will normally be appropriate. For other propulsion designs, where other driving pinions in the planetary gear (5-2, 5-5) are connected to the propeller (3), this braking device will be the braking device used for the planetary gear's driving pinion (5-2 or 5-5) that is connected to the propeller (3). (See also 4-1 and 5-1)

5-2) the Planetary Sun Gear.

The sun gear in a propulsion system for drones may be configured to be driven by, or drive, an electric motor/generator (4). Other configurations are also possible, e.g., for driving a propeller (3) or being driven by a combustion engine (1).

5-3) the Planetary Gears.

The planet gears may be mounted on the planet carrier (5-4) under some examples.

5-4) the Planet Carrier.

In a propulsion system for drones the planet carrier will normally drive a propeller/propellers (3), but other configurations are also possible. The planet carrier may also be driven by a combustion engine (1) or be driven by/drive an electric motor/generator (4).

5-5) the Ring Gear.

In a propulsion system for drones the ring gear may be driven by the combustion engine (1). However other configurations are also possible, both for driving a propeller (3) or being driven by/driving an electric motor/generator (4).

6) Belt/Chain Tensioner and Guide Wheel.

The belt/chain tensioner and guide wheel may be configured as a wheel/roller for guiding and tensioning a drivebelt or chain (2).

7) Battery.

In some examples, one or more batteries may be used, but they should, in any case hold, sufficient energy to give the propulsion system sufficient redundancy, or enough energy for zero-emissions operation in regulated areas.

8) Capacitator.

In some examples, one or more capacitors may be used, that are charged in order to provide some or all of the electric motors (4) with extra energy, e.g. for lifting (take-off) or rapid evasive maneuvers, etc.

9) Fuel System.

The fuel system may include a fuel tank and fuel system for the combustion engine (1). Dependent on type of vessel/mode of transport, this may include one or more fuel tanks and a fuel delivery system for the combustion engine(s) (1). The type of fuel and fuel system may vary according to the type of vessel/mode of transport, and the type of combustion engine (1). The engines may be any known variant of combustion engines (1) and run on all known types of fuel that can be used in combustion engines (1) including biofuels and zero-emissions alternatives such as ammonia and pure hydrogen etc. For Wankel or other rotary engines and conventional 2-stroke Otto cycle engines, any 2-stroke oil may be mixed with the fuel, or have its own feed system from a separate oil tank. In some examples, the combustion engine may be configured as a multi-fuel engine capable of operating on more than one type of fuel, including hydrogen, ammonia, biofuels, or conventional fuels, either individually or sequentially, depending on the engine configuration.

10) The Mode of Transport's Frame/Chassis/Hull

In some examples, the frame/chassis/hull may be configured as the frame of a drone, or the chassis/hull of other modes of transport. In drones, choice of material may be important in order to save weight and drones have traditionally been built of carbon-fiber reinforced epoxy materials. Another material widely used in car chassis, which can also be used for drones and other vessels, is boron steel. This steel has a strength/weight ratio that enables it to compete with other metals, and it is tougher and more ductile than carbon-fiber reinforced epoxy. If hybrid operation is used for only some of the propellers (3), and the other propellers (3) are operated electrically in the traditional way, the arms and any other fastening devices for these propellers (3) may be fixed at a different height from the hybrid ones. The purpose of this arrangement is that these arms and propellers (3) with electric drives can be either collapsible or removable, allowing the drone to be stored and carried more easily as its size (width) will be less than when it is in operating configuration.

A drone or other mode of transport may also have a control unit that governs engines/motors (1 and 4) and propellers (3), as well charging of batteries (7) and capacitators (8).

Depending on the mode of transport there will also be a cushioned undercarriage, or floats for landing on water, as well as other functions such as a cockpit, if the drone is a rescue or taxi drone.

Combustion engines (1), electric motors/generators (4) and propellers (3) may be configured to have speed sensors signaling the speed of rotating components, so that the control unit can regulate the correct gear and operating mode for combustion engines (1), electric motors/generators (4) and propellers (3).

In some examples, drones may be remotely controlled, but may also operate autonomously, or by a combination of these methods.

The following provides exemplary configurations of the present disclosure in multiple applications A) Propulsion System for a Large Drone with Eight Propellers.

Figure 3:
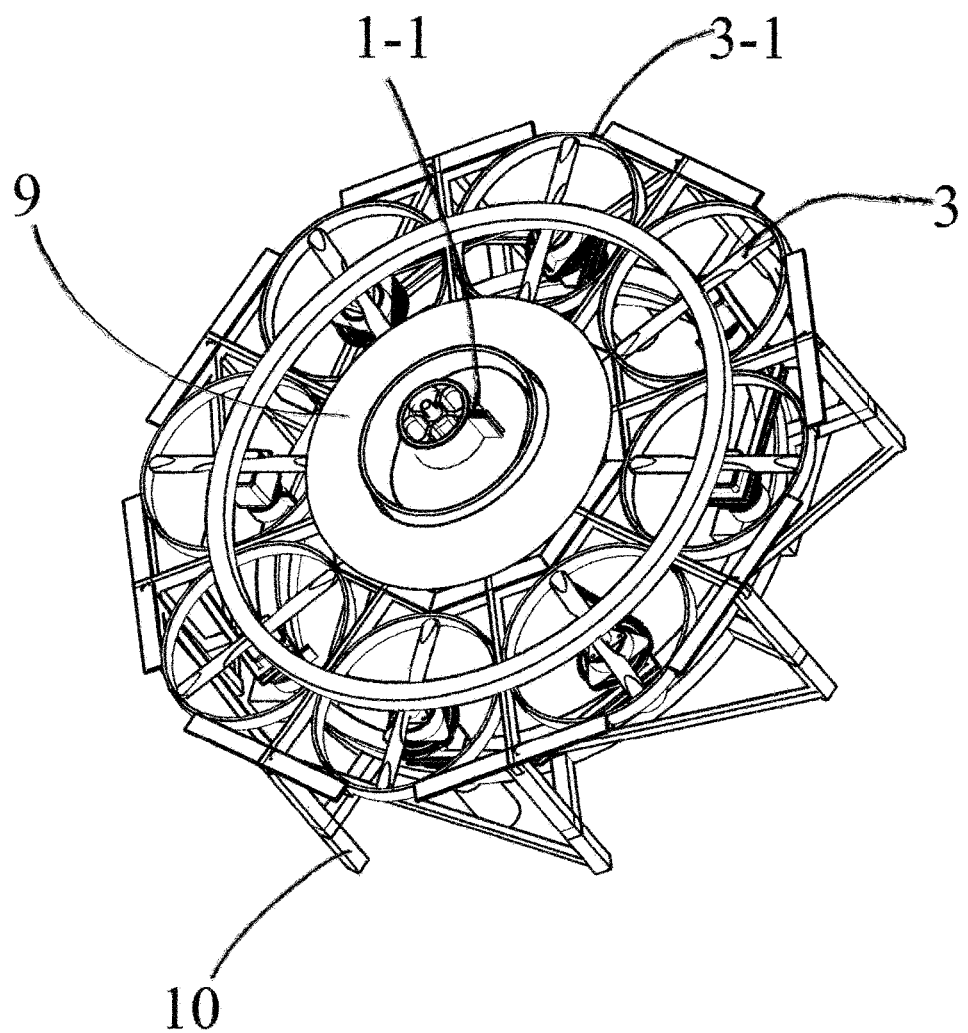
FIG. 3 illustrates an example of a long-range drone, seen from above, including a propeller configuration and method of operation illustrated in FIGS. 1 and 2, under some aspects of the present disclosure.
Figure 4:
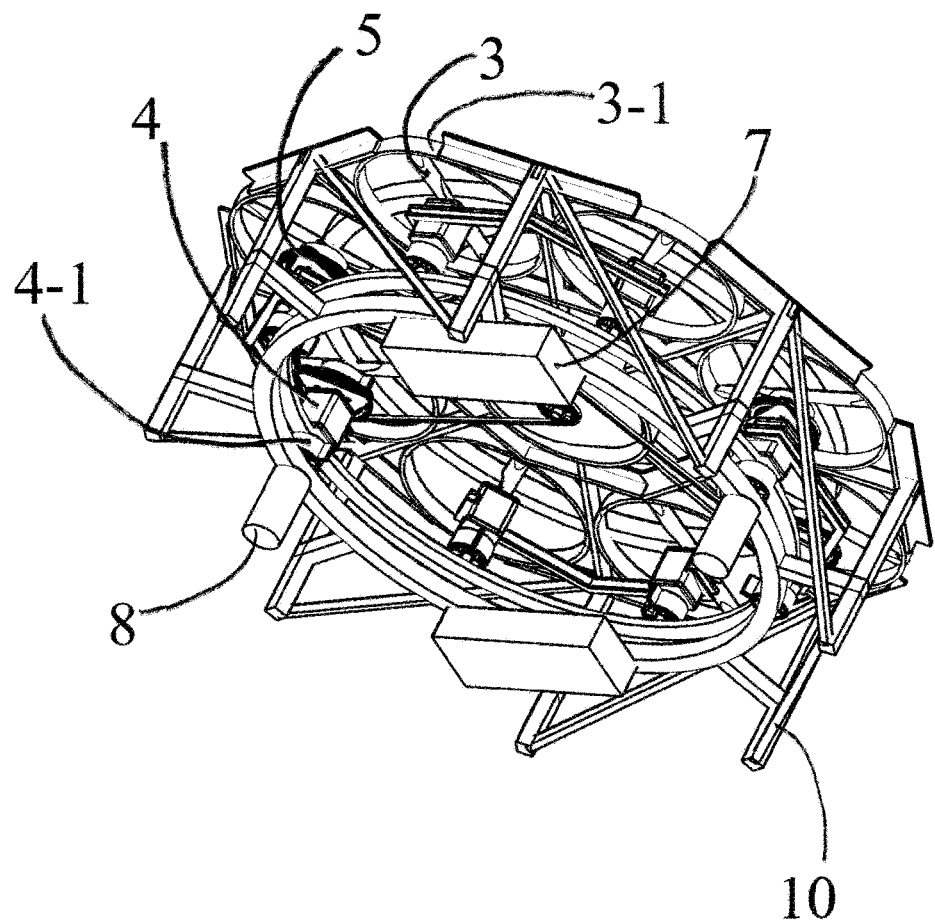
FIG. 4 illustrates an example of the long-range drone of FIG. 3, seen from below, under some aspects of the present disclosure.

An embodiment of a drone intended either for heavy lifting or for passenger transport is shown in the drawings, in FIGS. 3 and 4.

In some examples, a hybrid drone of this nature might be a configuration with 8 propellers (3), where four of the propellers (3) have hybrid propulsion and the other four have purely electric propulsion. Other configurations are also possible, with different numbers of propellers (3), and all or just some of them having hybrid propulsion.

A safety requirement is to have enough lifting capacity, even if part of the propulsion system fails (redundancy). Normally this will be a lifting/carrying capacity of 2 or 3 times the maximum permitted payload.

Figure 5:
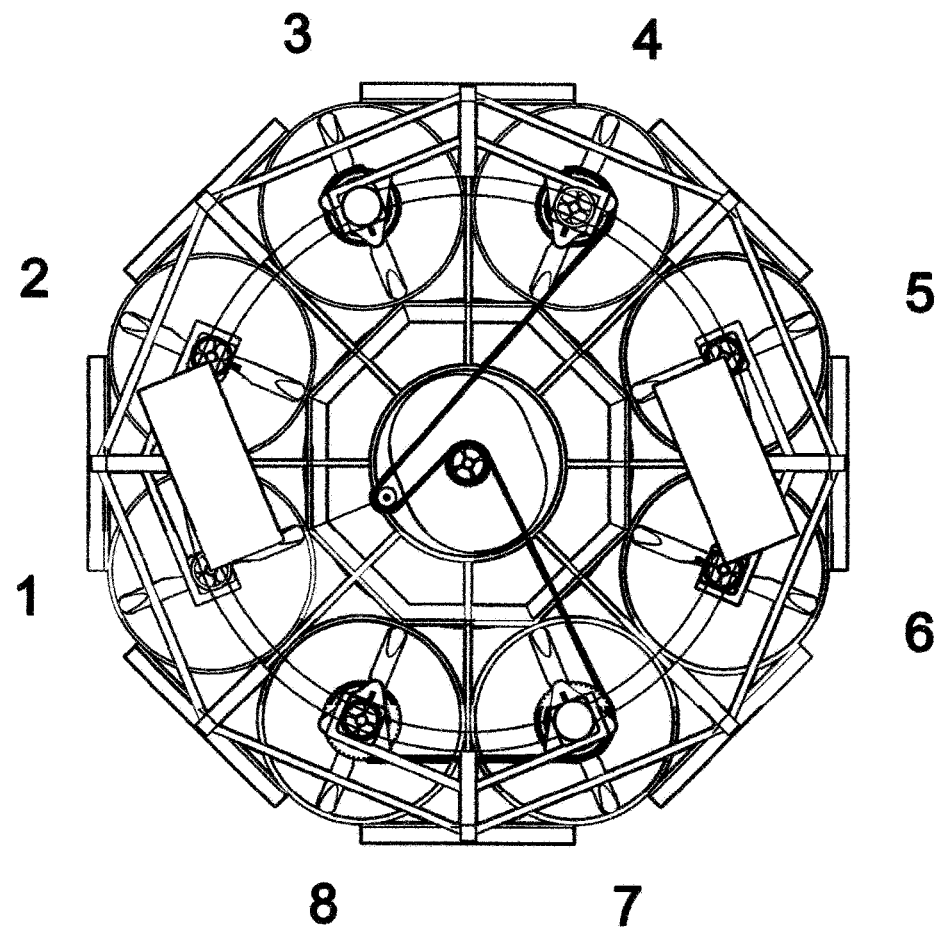
FIG. 5 illustrates the propellers with planetary gears and electric motors/generators for the drone in FIG. 3 under some aspects of the present disclosure.
Figure 6:
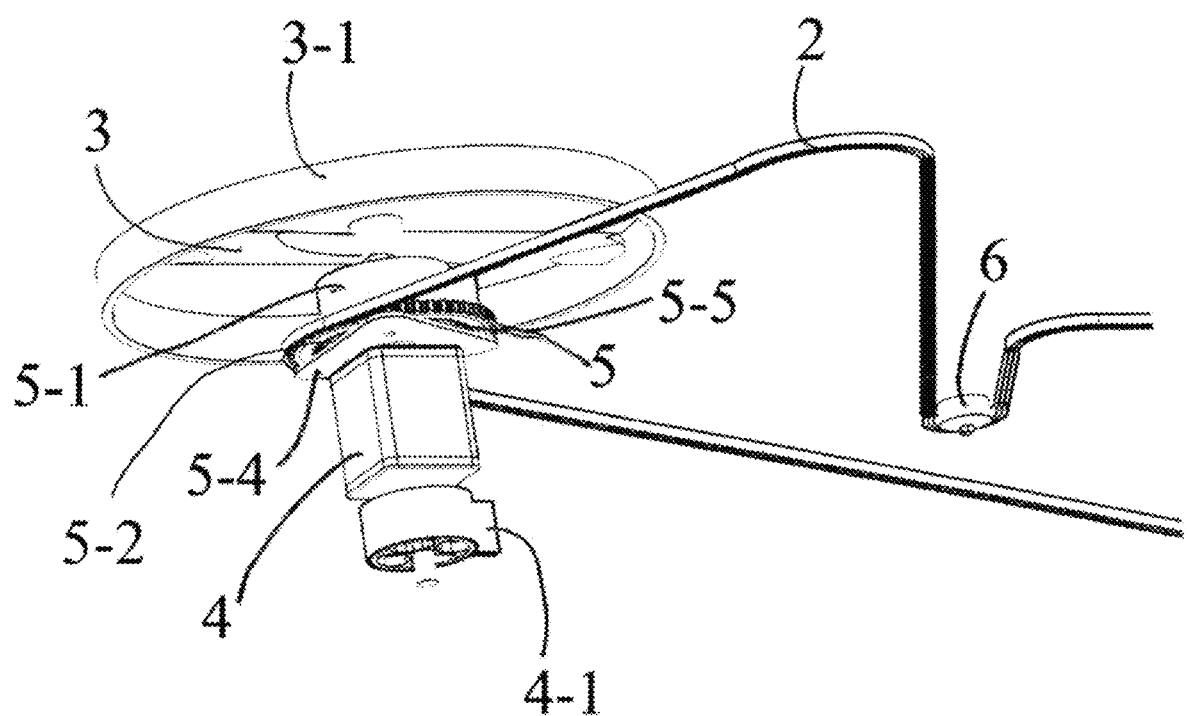
FIG. 6 illustrates an embodiment of the hybrid operation of a propeller fitted to a planetary gearset with electric motor/generator, where the planetary gear is driven by a drivebelt from the combustion engine under some aspects of the present disclosure.

In the embodiment of FIGS. 3 and 4, the propulsion system may be designed so that in each pair of propellers (3) that are opposite one another, one is electrically operated and the other is hybrid operated. The numbering of the propellers in the embodiment of FIGS. 3 and 4 is shown in FIG. 5. Propellers (3) numbers 1, 2, 5 and 6 in FIG. 5 are driven purely by electricity from the electric motor (4), while the propellers (3) numbers 3, 4, 7 and 8 in FIG. 5 are hybrid operated. The propellers (3) will normally be operated in one of three different configurations:

Alt. 1—either by a combustion engine (1), where the electric motors/generators (4) numbers 1 to 8 in FIG. 5 are kept at rest by a braking device for an electric motor/generator (4-1). The combustion engine drives the ring gear (5-5) via a toothed belt (2), and the planetary gears (5) functions as a fixed-axis gear to the propellers (3) numbers 1 to 8 in FIG. 5.

Alt. 2 is driven by a combustion engine (1), where electric motors/generators (4) numbers 3, 4, 7 and 8 in FIG. 5 function as generators for producing electric current both for charging batteries (7) and capacitors (8), and also drive some or all of the electric motors (4) for propellers (3) numbers 1, 2, 5 and 6 in FIG. 5, which are driven purely by electricity. The planetary gearset (5) will then function as a continuously variable transmission where the combustion engine (1) will normally be run at constant speed, while electric motors/generators (4) numbers 3, 4, 7 and 8 in FIG. 5 will regulate charging for continuously variable adjustment of the propeller's (3) speed, and will supply current to electric motors (4) numbers 1, 2, 5 and 6 in FIG. 5 to drive some or all of these as well.

Alt. 3—combustion engine (1) is kept at rest by the braking device (1-1), and some or all of the electric motors/generators (4) drive the propellers (3) numbers 1 to 8 in FIG. 5 via planetary gearset (5). Planetary gearset (5) functions as a fixed-axis gear.

In addition, a fourth alternative will be used for rapid take-off, heavy lifting or rapid evasive maneuvers.

Alt. 4—combustion engine (1) drives the propellers together with one or more of the electric motors/generators (4), which are powered by current from a battery/batteries (7) and any capacitors (8). The purpose is to provide greater lifting capacity or good maneuverability.

In addition, the propellers (3) can be kept at rest with a braking device for the planet carrier (5-1). This will typically be when starting up the combustion engine (1) when the drone is at rest on the ground or landing platform etc. One or more of the electric motor/generators (4) numbers 3, 4, 7 and 8 in FIG. 5, which have hybrid operation, are used to start the combustion engine (1). The planetary gearset (5) then functions as a fixed-axis gear. This may also be the case if the combustion engine (1) is used to drive one or more of the electric motor/generators (4) numbers 3, 4, 7 and 8 in FIG. 5, which have hybrid operation, for charging of batteries (7) and/or capacitors (8).

Other configurations of combustion engines (1) electric motors/generators (4), propellers (3) and planetary gears (5) are also possible and shall be included in the present disclosure. An example is large drones that are used for heavy lifting. Here combustion engines (1) and electric motors/generators (4) can, for example, exchange places.

B) Propulsion Systems for Ships.

For ships there can be several combinations of combustion engines (1), electric motor/generators (4), propellers (3) and planetary gears (5). Three of the most relevant combinations will involve using one, two or three propulsion propellers aft.

One Propeller Configuration:

One possible configuration for a ship with one propeller (3), is for it to be driven directly by the combustion engine (1) through one of the planetary gear's (5) driving pinions. For example, this might be by the planetary sun gear (5-2) being driven by the combustion engine (1), while the planetary sun gear (5-2) then also drives the propeller shaft (3). In this configuration one of the planetary gear's (5) other driving pinions will be kept at rest, while electric motor/generators (4) drive or are driven by the last of the planetary gear's (5) driving pinions.

The electric motor/generator (4) will in this case act as a generator and produce electric current for running other systems including other electric motors (4) and propellers (3), such as one or more azimuth thrusters/pods for example, and for charging of any batteries (7).

Or the electric motor/generators (4) can be used for propulsion, together with the combustion engine (1) for driving the propeller (3). If the main propulsion propeller (3) is only driven by electric motor/generators (4) there must be a clutch arrangement or free-wheel hub between the combustion engine (1) and the planetary sun gear (5-2).

Alternatively, the combustion engine (1) may drive one of the planetary gear's (5) driving pinions, while electric motor/generators (4) drive or are driven by another of the planetary gear's (5) driving pinions and the propeller (3) is driven by the third. The advantage or a hybrid system with the drive coming from both a combustion engine (1) and electric motor/generators (4) is that the combustion engine (1) can run at optimal speed and loading, in order to achieve best possible fuel utilization. Electric motor/generators (4) will compensate for fluctuations in the engine load. This is especially important when operating with low-flammability fuels.

Two Propellers Configuration:

Where a ship has two propellers (3) each may be driven by its own planetary gearset (5). A typical configuration may be that the combustion engine (1) drives the planetary sun gear (5-2) via a fixed-axis gear. The planetary gear's wheel carriers (5-4) drive the propellers (3) and electric motor/generators (4) drive or are driven by the ring gear (5-5). In this configuration the ship will be maneuvered with continuously variable regulation of the propellers' (3) speed. In order to put the propellers (3) in reverse either a fixed-axis gear between the combustion engine (1) and the planetary gears (5) can be reversible, or a clutch arrangement together with a braking device (1-1) can hold the input shaft from a combustion engine (1) on the planetary gears (5) at rest, while electric motors/generators (4) drive the propellers (3) in reverse-either together or individually. This will reduce or remove the need for one rudder on the ship. A system for regulating the electric motor/generators' (4) power output based on steering wheel (rudder) deflection must be designed for such a propulsion system.

Three Propellers Configuration:

This may be a combination of the propulsion systems for one or two propellers. Normally each propeller shaft (3) will be driven via its own planetary gearset (5).

A hybrid solution for ships may apply to many different types of ships and applications. Hybrid operation is especially relevant for combustion engines (1) that run on low-flammability fuels such as ammonia. Some biofuels also fall into this category of low-flammability fuels. These fuels will require more stationary running of the combustion engine (1) in order to maximize utilization and thus efficiency of combustion. Electric motors/generators (4) will be required to compensate for fluctuations in operating conditions in order to keep the loading on the combustion engine (1) almost constant, by charging batteries (7) or providing current to other systems when the loading on the propellers (3) is low. They may also provide extra propulsion when the loading on the propellers (3) is high. This may be the case in ammonia-powered ferries, for example, or ships that wholly or partially use various biofuels such as a lignin/bio-ethanol mix.

Other configurations of combustion engines (1) electric motors/generators (4), propellers (3) and planetary gears (5) are also possible and shall be included in the present disclosure.

C) Propulsion System for a Diesel-Electric Train.

A propulsion system for a diesel-electric train will involve using one or more combustion engines (1) to drive at least two electric motor/generators (4) via a planetary gearset (5). On start-up, the advantage is that there is no need to convert the frequency of the current. This is regulated via the planetary gear on a continuously variable basis. One of the electric motor/generators (4) functions as a generator that delivers current to the electric propulsion motors, while the second motor/generator (4) replaces the frequency converter by giving the first electric motor/generator (4) the right speed, so that it always delivers current to the train's propulsion motors at the correct frequency.

When the train has reached normal speed, this second electric motor/generator (4) will be locked so that the combustion engine (1) then has an rpm setting that together with the transmission to the main generators (4) provides the right frequency of current to the electric propulsion motors.

In places where the railway line has an electric contact line this hybrid system will normally be switched off, or be used as a generator plant for supplying current back to the electricity grid. The planetary gearset (5) will again be able to regulate speed, so that the frequency is correct from the one electric motor/generator (4), while for the other the current must be converted. Then the grid current can be used to control the conversion so that phase and frequency are correct.

In addition to traditional diesel-electric operation the combustion engine (1) can also use other fuels, for example ammonia or biofuel.

One skilled in the art will appreciate that the present disclosure illustrates a hybrid system for drones and other modes of transport. The advantage of a hybrid system is that a combustion engine (1) provides range and/or lifting capacity for drones and other modes of transport, while the electric motors/generators (4) will provide both control and maneuverability, because electric motors/generators (4) can provide more precise control and speed regulation. A combustion engine (1) can both be used in conjunction with one or more electric motors/generators (4) for propulsion, or for charging a battery/batteries (7) and any capacitator(s) (8), or for production of electric current for other purposes. One or more combustion engines (1), in conjunction with one or more electric motors/generators (4), will be an integral part of a propulsion system whereby each is connected to and drives its own driving pinion in one or more planetary gear sets (5). This will also provide continuously variable transmission for driving propellers (3) or driveshafts (3) on drones or other modes of transport. The combustion engine (1) can be connected directly to one of the planetary gear's driving pinions (5-2-5-5), or can drive one of the planetary gear's driving pinions (5-2-5-5) with a chain or belt (2) which is driven by the combustion engine's drive pulley (1-2) via a tensioner and/or guide wheel (6). If the propellers (3) are only driven by either a combustion engine (1), or an electric motor/generator (4), the other engine/motor will be kept at rest by a braking device for a combustion engine (1-1) or a braking device for an electric motor/generator (4-1). On start-up, or if the drone only has power applied to some of its propellers (3), the other propellers (3) will be kept at rest by a braking device (5-1). The electric motors/generators (4) will be driven by a battery/batteries (7) and capacitator(s) (8), or some of the electric motors/generators (4) may be run in order to produce electric current to power other electric motors/generators (4). A separate fuel system (9) supplies the combustion engine(s) (1). All components are fitted into the frame of the drone (10). Variants of this hybrid system can also be used for other vessels and vehicles such as ferries, ships, trains etc. All types of fuels may also be used, in a variety of types of combustion engine (1).

The invention claimed is:

1. A hybrid propulsion system, comprising:
one or more combustion motors;
one or more electric motors;
at least one driveshaft or propeller; and
a planetary gearset, configured to operatively couple the one or more combustion motors and the one or more electric motors, and the at least one driveshaft or propeller, wherein each of the one or more combustion motors, the one or more electric motors, and the at least one driveshaft or propeller is continuously engaged with a respective driving pinion of the planetary gearset to enable continuous power transmission through the planetary gearset, and wherein the planetary gearset is further configured to continuously vary the rotation speeds of the planetary gearset components by dynamically regulating the speed of the one or more electric motors for providing an adaptive response to varying propulsion needs;
wherein braking devices are provided for the one or more combustion motors, the one or more electric motors, and the at least one driveshaft or propeller, each braking device being configured to selectively lock its respective driving pinion when its associated combustion motor, electric motor, or driveshaft or propeller is not providing or receiving power, the braking devices together enabling the planetary gearset to function as a continuously variable transmission without disengagement of any coupled component, thereby directing power flow through the planetary gearset.

2. The hybrid propulsion system of claim 1, wherein the one or more electric motors are configured to (i) charge one or more batteries and/or one or more capacitors, and (ii) continuously variably regulate the speed of the driveshaft or propeller.

3. The hybrid propulsion system of claim 1, wherein the one or more electric motors comprises a plurality of electric motors, and wherein at least one of the plurality of electric motors is configured as a generator for producing electric current both for (i) charging one or more batteries and capacitors, and (ii) generating electric propulsion for one or more other electric motors by driving the driveshaft or propellers.

4. The hybrid propulsion system of claim 1, wherein the braking devices are further configured to hold or lock their respective driving pinions such that the planetary gearset optionally functions as a fixed-axis gear while maintaining continuous engagement of all coupled components.

5. The hybrid propulsion system of claim 4, wherein the planetary gearset is configured to function as a fixed-axis gear when the braking device for one of the one or more combustion motors, the one or more electric motors, or the at least one driveshaft or propeller is activated to lock its respective driving pinion, while the braking device for another of the one or more combustion motors, the one or more electric motors, or the at least one driveshaft or propeller is not activated.

6. The hybrid propulsion system of claim 1, wherein the one or more combustion motors are configured to drive the planetary gearset directly, or (i) via cogwheels, or (ii) a chain drive or a belt drive.

7. The hybrid propulsion system of claim 1, wherein the one or more combustion motors are configured to be operated by one of hydrogen fuel, ammonia fuel, biofuel, dual-fuel or multi-fuel.

8. A method for configuring a hybrid propulsion system, comprising:
configuring one or more combustion motors;
configuring one or more electric motors;
configuring at least one driveshaft or propeller; and
configuring a planetary gearset to operatively couple the one or more combustion motors, the one or more electric motors, and the at least one driveshaft or propeller, wherein configuring the planetary gearset comprises configuring each of the one or more combustion motors, the one or more electric motors, and the at least one driveshaft or propeller to be continuously engaged with a respective driving pinion of the planetary gearset to enable continuous power transmission through the planetary gearset, and configuring the planetary gearset to continuously vary the rotation speeds of the planetary gearset components by dynamically regulating the speed of the one or more electric motors for providing an adaptive response to varying propulsion needs; and configuring braking devices for the one or more combustion motors, the one or more electric motors, and the at least one driveshaft or propeller, each braking device being configured to selectively lock its respective driving pinion when its associated combustion motor, electric motor, or driveshaft or propeller is not providing or receiving power, the braking devices together enabling the planetary gearset to function as a continuously variable transmission without disengagement of any coupled component, thereby directing power flow through the planetary gearset.

9. The method of claim 8, wherein configuring the one or more electric motors comprises configuring the one or more electric motors to (i) charge one or more batteries and/or one or more capacitors, and (ii) dynamically regulate the speed of the at least one driveshaft or propeller.

10. The method of claim 8, wherein configuring the one or more electric motors comprises configuring a plurality of electric motors, and wherein at least one of the plurality of electric motors is configured to function as a generator for producing electric current both for (i) charging one or more batteries and capacitors, and (ii) generating electric propulsion for one or more other electric motors by driving the at least one driveshaft or propellers.

11. The method of claim 8, further comprising configuring the braking devices to hold or lock their respective driving pinions such that the planetary gearset optionally functions as a fixed-axis gear while maintaining continuous engagement of all coupled components.

12. The method of claim 11, wherein the planetary gearset is configured to function as a fixed-axis gear when the braking device for one of the one or more combustion motors, the one or more electric motors, or the at least one driveshaft or propeller is activated to lock its respective driving pinion, while the braking device for another of the one or more combustion motors, the one or more electric motors, or the at least one driveshaft or propeller is not activated.

13. The method of claim 8, wherein configuring the one or more combustion motors comprises configuring the one or more combustion motors to drive the planetary gearset directly, or (i) via cogwheels, or (ii) via a chain drive or belt drive.

14. The method of claim 8, wherein configuring the one or more combustion motors comprises configuring the one or more combustion motors to be operated by one of hydrogen fuel, ammonia fuel, biofuel, dual-fuel or multi-fuel.

15. A hybrid propulsion system, comprising:
one or more combustion motors;
one or more electric motors;
at least one driveshaft or propeller; and
a planetary gearset, wherein the planetary gearset is configured to operatively couple the one or more combustion motors, the one or more electric motors, and the at least one driveshaft or propeller, wherein each of the one or more combustion motors, the one or more electric motors, and the at least one driveshaft or propeller is continuously engaged with a respective driving pinion of the planetary gearset to enable continuous power transmission through the planetary gearset, and wherein the planetary gearset is further configured to continuously vary the rotation speeds of the planetary gearset components by dynamically regulating the speed of the one or more electric motors for providing an adaptive response to varying propulsion needs, wherein braking devices are provided for the one or more combustion motors, the one or more electric motors, and the at least one driveshaft or propeller, each braking device being configured to selectively lock its respective driving pinion when its associated combustion motor, electric motor, or driveshaft or propeller is not providing or receiving power, the braking devices together enabling the planetary gearset to function as a continuously variable transmission without disengagement of any coupled component, thereby directing power flow through the planetary gearset, and the braking devices being further configured to hold or lock their respective driving pinions such that the planetary gearset optionally functions as a fixed-axis gear.

16. The hybrid propulsion system of claim 15, wherein the one or more electric motors are configured to (i) charge one or more batteries and/or one or more capacitors, and (ii) dynamically regulate the speed of the at least one driveshaft or propeller.

17. The hybrid propulsion system of claim 15, wherein the one or more electric motors comprises a plurality of electric motors, and wherein at least one of the plurality of electric motors is configured as a generator for producing electric current both for (i) charging one or more batteries and capacitors, and (ii) generating electric propulsion for one or more other electric motors by driving the at least one driveshaft or propellers.

18. The hybrid propulsion system of claim 15, wherein the planetary gearset is configured to function as a fixed-axis gear when the braking device for one of the one or more combustion motors, the one or more electric motors, or the at least one driveshaft or propeller is activated to lock its respective driving pinion, while the braking device for another of the one or more combustion motors, the one or more electric motors, or the at least one driveshaft or propeller is not activated.

19. The hybrid propulsion system of claim 15, wherein the one or more combustion motors are configured to drive the planetary gearset directly, or (i) via cogwheels, or (ii) a chain drive or belt drive.

20. The hybrid propulsion system of claim 15, wherein the one or more combustion motors are configured to be operated by one of hydrogen fuel, ammonia fuel, biofuel, dual-fuel or multi-fuel.

* * * * *